United States Patent [19]

Chung et al.

[11] Patent Number: 5,022,053
[45] Date of Patent: Jun. 4, 1991

[54] DATA COMMUNICATIONS WITH ALTERNATION OF SIGNALING CONSTELLATIONS

[75] Inventors: Hong Y. Chung, Eatontown; Michael D. Rauchwerk, Holmdel, both of N.J.

[73] Assignee: AT&T Bell Laboratories, Murray Hill, N.J.

[21] Appl. No.: 335,257

[22] Filed: Apr. 10, 1989

[51] Int. Cl.$^5$ .................... H04J 15/00; H04L 27/34
[52] U.S. Cl. ........................ 375/39; 370/110.1
[58] Field of Search ............ 375/27, 38, 39, 121; 371/37.1, 43; 370/110.1, 110.4, 119; 332/103

[56] References Cited

U.S. PATENT DOCUMENTS

| | | | |
|---|---|---|---|
| 4,586,182 | 4/1986 | Gallager | 375/25 |
| 4,644,537 | 2/1987 | Gitlin et al. | 370/119 |
| 4,721,928 | 1/1988 | Yoshida | 375/39 |
| 4,937,844 | 6/1990 | Kao | 375/39 |

*Primary Examiner*—Benedict V. Safourek
*Attorney, Agent, or Firm*—Ronald D. Slusky; David R. Padnes

[57] ABSTRACT

Primary and secondary data are communicated from a transmitter to a receiver in a communication system. The value of an individual primary data word is communicated by transmitting an individual one of first plurality of channel symbols associated with that value while the value of a combined data word comprising an individual primary data word and an individual secondary data word is communicated by transmitting an individual one of second plurality of channel symbols associated with that value. In the receiver, both the primary and secondary data word values are recovered from the channel symbols thus transmitted. The approach of alternating two sets of channel symbols for transmission depending on the data word size can further apply to data communications at various fallback speeds.

28 Claims, 7 Drawing Sheets

| Q\I | -15 | -13 | -11 | -9 | -7 | -5 | -3 | -1 | 1 | 3 | 5 | 7 | 9 | 11 | 13 | 15 |
|---|---|---|---|---|---|---|---|---|---|---|---|---|---|---|---|---|
| 15 | | | | | | | | | | | | | | | | |
| 13 | | | | | | 97 | 8c | 8b | 84 | 93 | 98 | | | | | |
| 11 | | | | 9e | 79 | 72 | 69 | 66 | 61 | 6e | 75 | 7e | | | | |
| 9 | | | | 83 | 5c | 57 | 4c | 47 | 40 | 4b | 50 | 5b | 80 | 9f | | |
| 7 | | | 7d | 5a | 3d | 3a | 31 | 2a | 21 | 2e | 35 | 3e | 5d | 7a | | |
| 5 | | 9b | 74 | 53 | 34 | 27 | 1c C | 17 B | 10 C | 1b B | 24 | 3b | 54 | 73 | 94 | |
| 3 | | 92 | 6d | 4a | 2d | 1a | 0d | 0a | 05 | 0e | 1d | 32 | 4d | 6a | 8d | |
| 1 | | 87 | 60 | 43 | 20 | 13 | 04 A | 03 D | 00 A | 0b D | 14 | 2b | 44 | 67 | 88 | |
| -1 | | 8a | 65 | 46 | 29 | 16 | 09 C | 02 B | 01 C | 06 B | 11 | 22 | 41 | 62 | 85 | |
| -3 | | 8f | 68 | 4f | 30 | 1f | 0c A | 07 D | 08 A | 0f D | 18 | 2f | 48 | 6f | 90 | |
| -5 | | 96 | 71 | 56 | 39 | 26 | 19 | 12 | 15 | 1e | 25 | 36 | 51 | 76 | 99 | |
| -7 | | | 78 | 5f | 3c | 37 | 2c | 23 | 28 | 33 | 38 | 3f | 58 | 7f | | |
| -9 | | | | 9d | 82 | 59 | 52 | 49 | 42 | 45 | 4e | 55 | 5e | 81 | | |
| -11 | | | | | 7c | 77 | 6c | 63 | 64 | 6b | 70 | 7b | 9c | | | |
| -13 | | | | | | 9a | 91 | 86 | 89 | 8e | 95 | | | | | |
| -15 | | | | | | | | | | | | | | | | |

☐ ENCLOSES INNER POINTS  
⌐ ⌐ ENCLOSES OUTER POINTS

FIG. 6

| I \ Q | -15 | -13 | -11 | -9 | -7 | -5 | -3 | -1 | 1 | 3 | 5 | 7 | 9 | 11 | 13 | 15 |
|---|---|---|---|---|---|---|---|---|---|---|---|---|---|---|---|---|
| 15 |  |  |  |  |  | b5 | b2 | ad | ba |  |  |  |  |  |  |  |
| 13 |  |  |  | a4 | 97 | 8c | 8b | 84 | 93 | 98 | ab |  |  |  |  |  |
| 11 |  |  | bd | 9e | 79 | 72 | 69 | 66 | 61 | 6e | 75 | 7e | a1 | be |  |  |
| 9 |  |  | a0 | 83 | 5c | 57 | 4c | 47 | 40 | 4b | 50 | 5b | 80 | 9f |  |  |
| 7 |  | aa | 7d | 5a | 3d | 3a | 31 | 2a | 21 | 2e | 35 | 3e | 5d | 7a | a5 |  |
| 5 |  | 9b | 74 | 53 | 34 | 27 | 1c | 17 | 10 | 1b | 24 | 3b | 54 | 73 | 94 |  |
| 3 | b9 | 92 | 6d | 4a | 2d | 1a | 0d | 0a | 05 | 0e | 1d | 32 | 4d | 6a | 8d | b6 |
| 1 | ac | 87 | 60 | 43 | 20 | 13 | 04 | 03 | 00 | 0b | 14 | 2b | 44 | 67 | 88 | b3 |
| -1 | b1 | 8a | 65 | 46 | 29 | 16 | 09 | 02 | 01 | 06 | 11 | 22 | 41 | 62 | 85 | ae |
| -3 | b4 | 8f | 68 | 4f | 30 | 1f | 0c | 07 | 08 | 0f | 18 | 2f | 48 | 6f | 90 | bb |
| -5 |  | 96 | 71 | 56 | 39 | 26 | 19 | 12 | 15 | 1e | 25 | 36 | 51 | 76 | 99 |  |
| -7 |  |  | 78 | 5f | 3c | 37 | 2c | 23 | 28 | 33 | 38 | 3f | 58 | 7f |  |  |
| -9 |  |  | 9d | 82 | 59 | 52 | 49 | 42 | 45 | 4e | 55 | 5e | 81 | a2 |  |  |
| -11 |  |  | bc | a3 | 7c | 77 | 6c | 63 | 64 | 6b | 70 | 7b | 9c | bf |  |  |
| -13 |  |  |  | a9 | 9a | 91 | 86 | 89 | 8e | 95 | a6 |  |  |  |  |  |
| -15 |  |  |  |  |  | b8 | af | b0 | b7 |  |  |  |  |  |  |  |

☐ ENCLOSES INNER POINTS  
⌐ ⌐ ENCLOSES OUTER POINTS

DATA COMMUNICATIONS WITH ALTERNATION OF SIGNALING CONSTELLATIONS

BACKGROUND OF THE INVENTION

The present invention relates to techniques for communicating primary and secondary data streams over a communication channel.

Voiceband modems and other data transmission systems often have the capability of transmitting so-called secondary data in addition to the so-called primary data. The primary data contains "user" information communicated between users while the secondary data typically carries diagnostic and/or maintenance information used within the transmission system itself and not usually passed on to the users.

There are two principal ways of communicating the secondary data.

The first of these is so-called "out-of-band" approach. Here, the secondary data is transmitted in a channel separate from that in which the primary data is transmitted—typically a frequency-division-multiplexed channel.

The out-of-band approach, however, often imposes severe constraints upon the bandsplitting filter required for separating a primary channel from a secondary channel. Such constraints occur in a bandlimited environment when higher and higher primary data rates are desired, and in order to maintain satisfactory error performance, a corresponding increase in the primary channel bandwidth is necessary. As a consequence, the bandwidth available for the secondary channel is accordingly decreased.

The above consideration renders the second, "in-band" approach, more attractive for many high speed communications. This approach, unlike the "out-of-band" approach, requires both sets of primary and secondary data to be transmitted within a single frequency band. The "in-band" approach is conventionally realized by (1) expanding the number of allowed signal points in the signal constellation and (2) adding one or more secondary data bits to the block of primary data during each symbol interval. In an environment where power is normally limited for transmission, this expansion in the number of signal points necessarily results in a loss of noise immunity in the signal transmission.

SUMMARY OF THE INVENTION

Such prior art arrangements are not optimal if the rate at which secondary data is being generated is significantly less than the symbol transmission rate. This is because the loss of noise immunity occasioned by the use of the expanded constellation must be endured even during symbol intervals in which there is no secondary data to be transmitted.

The present invention broadly accomplishes, in a manner to be described, not only the minimization of the loss of noise immunity in such a situation, but also the achievement of fallback speeds of non-standard bit rates.

In accordance with the present invention, a plurality of signal constellations, which are comprised of various numbers of signal points, are individually selected in repetitive alternation. A particular signal point is identified from the selected constellation to represent the value of bits to be transmitted. Each of these signal constellations is used for the transmission of data at a particular incoming bit rate at a transmitter. Equivalently stated, each of these signal constellations is used for transmitting a particular number of one or more of bits taken in by the transmitter during a symbol interval.

For example, the present invention is illustratively applied to minimize the aforementioned noise-immunity problem related to the transmission of the primary and the secondary data using the "in-band" approach. In particular, a first constellation is used during symbol intervals in which a first number of bits containing only primary data need to be transmitted. However, when a second greater number of bits containing both primary and secondary data need to be transmitted, a second expanded constellation which is comprised of more signal points is used. This inventive approach—alternating between the two constellations depending on the presence of secondary data—minimizes the overall average power of the transmitted signal and hence minimizes the loss of noise immunity occasioned by the introduction of the secondary data. Illustratively, the primary data in the present embodiment is transmitted with and without the secondary data in a repetitive fashion. Therefore, the first and second constellations are correspondingly used in repetitive alternation.

The present invention can also be advantageously applied to implement fallback speeds of nonstandard bit rates by averaging, for example, first and second incoming bit rates at which bits are taken in by the transmitter and thereafter transmitted, by using the associated first and second, different constellations in repetitive alternation.

DETAILED DESCRIPTION

Figure 1:
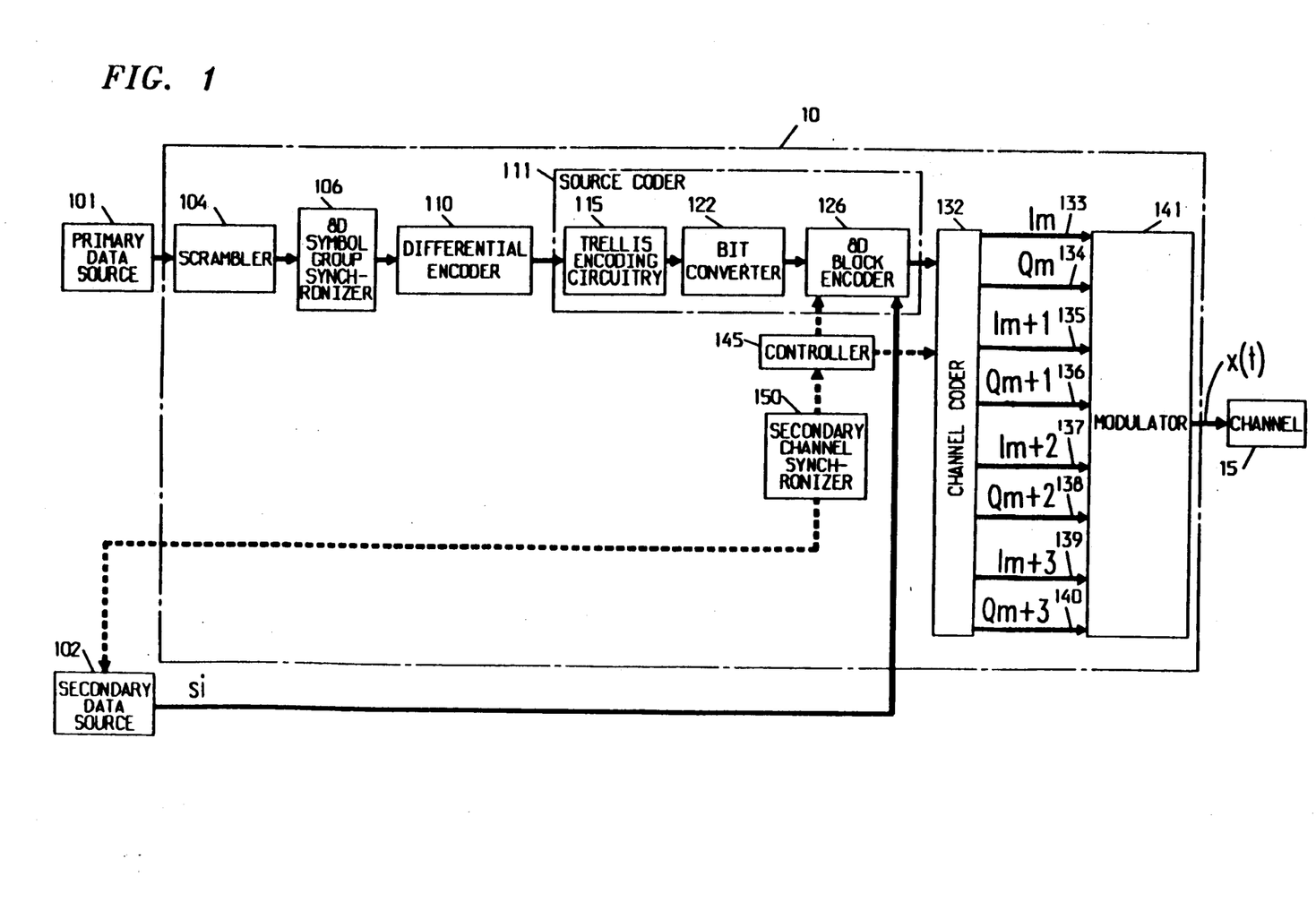
FIG. 1 is a block diagram of a data communication transmitter embodying the principles of the invention.

Transmitter 10 of FIG. 1 is illustratively the transmitter section of a voiceband modem. Bits to be transmitted are received by the transmitter from primary data source 101 and collected in groups of twenty-eight. Each group is then trellis-coded into an 8-dimensional channel symbol selected from a predetermined signal constellation. Each 8-dimensional symbol is transmitted over a transmission, or communication, channel 15 as four 2-dimensional double sideband quadrature carrier (DSB-QC) pulses in the course of four successive baud intervals, each of duration $T=1/2742.8571$ sec. Thus the bits are communicated at a rate of $T/4=685.7142$ 8-dimensional symbols per second, yielding a primary or "user" data transmission rate of 19.2 Kbps.

At the same time, secondary data from secondary data source 102 is transmitted, along with the primary data, at a rate of 342.8571 bits per second in a manner to be described. Secondary data source 102, which may be, for example, a microprocessor-based subsystem of the modem of which transmitter 10 is a part, generates various diagnostic and/or maintenance signals which are to be conveyed to, for example, a corresponding unit within a modem of which receiver 20 of FIG. 2, described hereinbelow, is a part. The output of secondary data source 102 is a stream containing individual secondary data words, each of which, in this illustrative embodiment, comprises a single data bit. The $i^{th}$ secondary data word is denoted Si.

In accordance with the invention, each transmitted 8-dimensional symbol is taken from one of a plurality of signal constellations. In the present embodiment, in particular, first and second 8-dimensional signal constellations are used for transmitting (1) primary data only and (2) both primary and secondary data, respectively. This process is described more fully hereinbelow.

Transmitter 10 more specifically includes scrambler 104, 8-dimensional (8D) symbol group synchronizer 106, differential encoder 110, source coder 111, channel coder 132, DSB-QC modulator 141, controller 145 and secondary channel synchronizer 150.

Scrambler 104 receives the stream of primary data from primary data source 101 which may be, for example, a digital computer. Scrambler 104, which is of conventional design, pseudo-randomizes the primary data to prevent concentrations of energy across the spectrum of the DSB-QC signal ultimately to be generated by modulator 141. The output of scrambler 104 is a serial bit stream which is applied to 8D symbol group synchronizer 106.

8D symbol group synchronizer 106 assembles the scrambled bits into twenty-eight-bit groups which are then applied to differential encoder 110 at the aforementioned symbol rate of 685.7142/sec. (In the general case, the group synchronizer assembles the scrambled bits into groups of $p \times q/2$ bits, where p is the dimensionality of the coding technique and q is the number of input bits coded in each 2-dimensional DSB-QC pulse baud interval. In this embodiment, illustratively, $p=8$ and $q=7$.)

Differential encoder 110, which is of conventional design, processes each successive group of twenty-eight bits provided by the 8D symbol group synchronizer to generate a differentially encoded twenty-eight-bit word. In accordance with conventional practice, the differential encoding performed by differential encoder 110 is such as to allow receiver 20 to recover the transmitted data correctly, notwithstanding possible symbol constellation "rotations" as the result, for example, of phase hits in the transmission channel. The output of differential encoder 110, a twenty-eight-bit word, or signal set, is applied to source coder 111.

Figure 3:
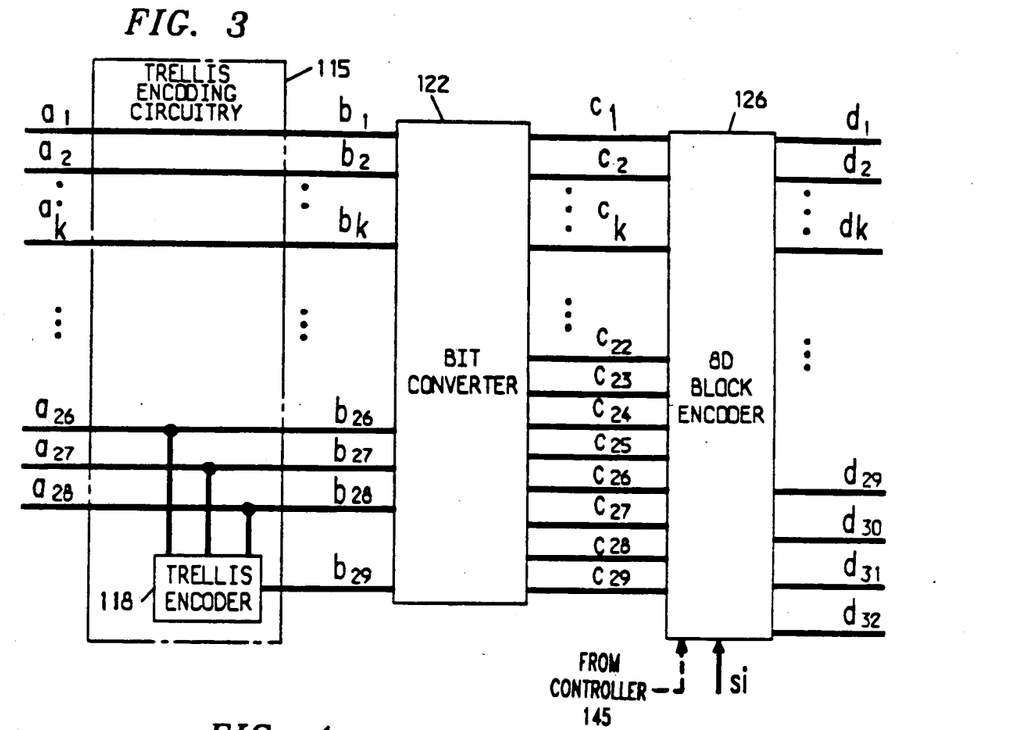
FIG. 3 is a block diagram describing a detailed connection between three components, i.e., a trellis encoding circuitry, a bit converter and an 8D block encoder, made part of the transmitter of FIG. 1.

As further shown in FIG. 1, source coder 111 includes trellis encoding circuitry 115, bit converter 122 and 8D block encoder 126. Further details of source coder 111 are shown in FIG. 3. In particular, the output word of differential encoder 110, comprised of bits a1–a28, is applied to trellis encoding circuitry 115. All twenty-eight of these bits pass through trellis encoding circuitry 115 to become bits b1–b28 applied to bit converter 122. In addition, trellis encoding circuitry 115 includes trellis encoder 118 which generates a twenty-ninth output bit, b29, also applied to bit converter 122.

Trellis encoder 118, more particularly, is illustratively a systematic ⅜, sixty-four-state encoder of conventional design which introduces redundancy into the signal set to allow the use of maximum likelihood decoding techniques at receiver 20. This redundancy illustratively takes the form of the aforementioned twenty-ninth bit (b29) which is generated by trellis encoder 118 in response to bits a26–a28. In exchange for this redundancy, the trellis code implemented by trellis encoder 118 will, if properly designed, provide the signal transmission system with so-called "coding gain" which manifests itself in the form of enhanced immunity to such random channel impairments as additive noise.

In the present illustrative embodiment, as in trellis coding arrangements generally, the signal points of the signal constellation need to be partitioned into subsets. In this embodiment, more particularly, there are sixteen subsets. As described in further detail hereinbelow, four bits of the output word of trellis encoding circuitry 115—bits b26–b29—identify the particular subset from which the signal point to be ultimately selected by channel coder 132 is to come while the other twenty-five bits, i.e., b1–b25, are used to identify a particular signal point from the identified subset.

As mentioned above, each 8-dimensional channel symbol is transmitted over channel 15 as four 2-dimensional DSB-QC pulses. In particular, the generation of the 2-dimensional DSB-QC pulses is carried out using a set of mapping tables. Each mapping table is used to identify a respective pair of pulse components represented by a particular one of the 2-dimensional DSB-QC pulses. Since there are four such pairs of pulse components in each 8-dimensional symbol, four such mapping tables are used. (The four mapping tables need not be all different from each other; indeed in the present embodiment, as will be seen, the four mapping tables are identical.)

Figure 5:
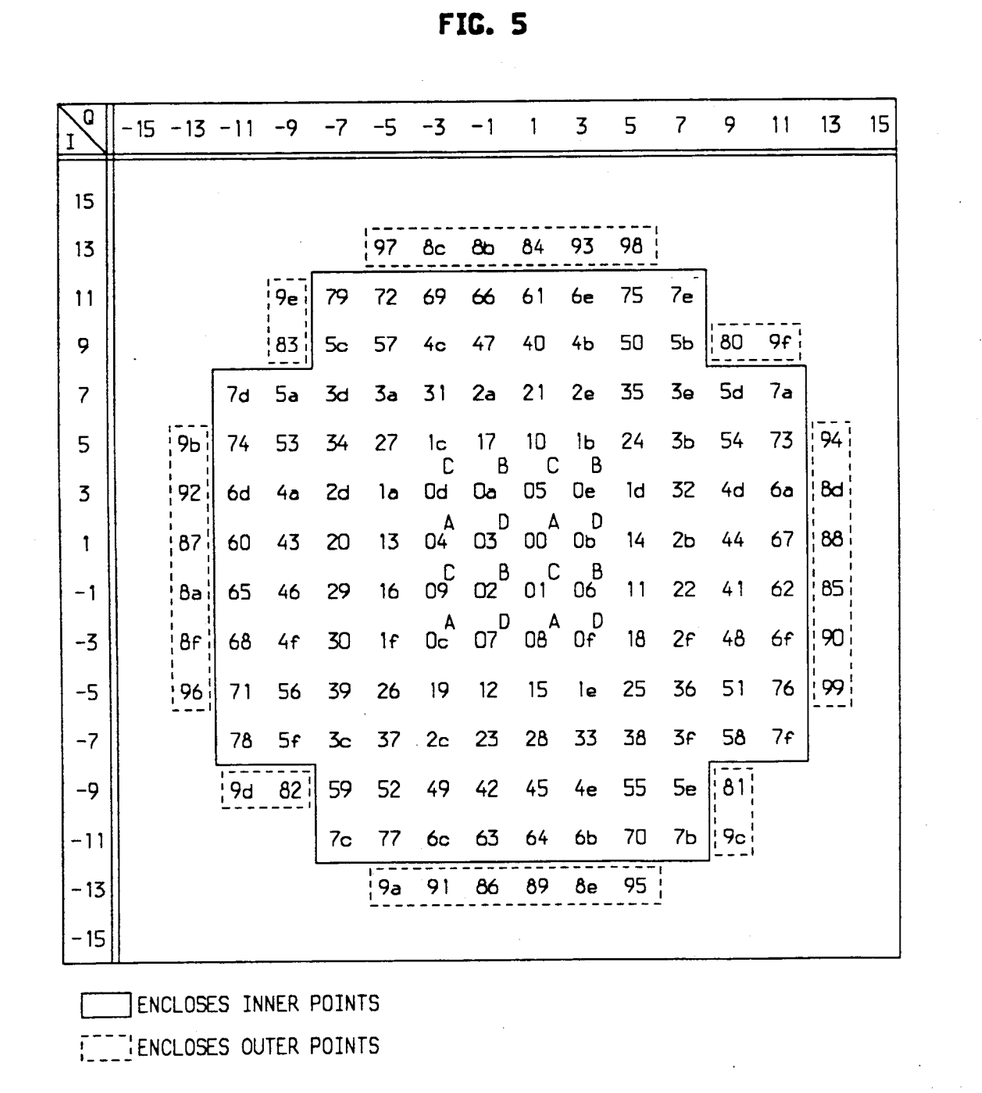
FIG. 5 is one of four identical mapping tables associated with a first 8-dimensional signal constellation used to communicate only primary data between the transmitter of FIG. 1 and the receiver of FIG. 2 in accordance with the invention.

FIG. 5 shows one of four identical mapping tables illustratively used for transmitting only primary data, i.e., when the first 8-dimensional signal constellation is used. This mapping table includes a plurality of 2-dimensional mapping points, each associated with a particular one of a number of different possible 2-dimensional DSB-QC pulses. Thus once four such mapping points—one from each mapping table—have been identified, the entire ensemble of four 2-dimensional DSB-QC pulses representing an 8-dimensional symbol to be transmitted has been identified.

The abscissa and the ordinate associated with each mapping point in the mapping table respectively identify the in-phase (I) and the quadrature-phase (Q) amplitudes of the pair of pulse components to be represented by a particular 2-dimensional DSB-QC pulse.

The manner in which a particular mapping point is identified in a particular mapping table involves the division of the mapping points into partitions. In FIG. 5, in particular, the mapping points are divided into four such partitions labeled A, B, C and D. As shown in FIG. 5, each of the sixteen central points is labeled to indicate to which partition it belongs. The assignment of the remaining mapping points to a particular partition follows the pattern shown.

Each of the aforementioned sixteen subsets of the signal constellation is characterized by particular combinations of four mapping point partitions—one from each of the four mapping tables which, as noted above, are identical to one another in this embodiment. For example, one such set of combinations for a particular one of the sixteen subsets, namely subset 0, includes the following sixteen combinations:

| AAAA | CCCC | ABAB | CDCD |
|------|------|------|------|
| AABB | CCDD | ABBA | CDDC |
| BBAA | DDCC | BAAB | DCCD |
| BBBB | DDDD | BABA | DCDC |

Each of the other fifteen subsets similarly contains signal points characterized by a respective set of sixteen combinations of mapping point partitions.

The identification of a particular combination of four mapping point partitions associated with the identified subset is performed by bit converter 122. In particular, bit converter 122 processes bits b1–b29, which as noted above include constellation-subset identifying bits b26–b29 and outputs a twenty-nine-bit output word comprised of bits c1–c29. Eight bits of this output word, namely c22–c29, identify the particular combination of four mapping point partitions. The remaining output bits, i.e., c1–c21, identify a particular mapping point in each of the respective four mapping tables, and thus a particular point in the identified subset.

This function of identifying a particular mapping point in each mapping table is achieved by 8D block encoder 126. Each mapping point, as shown in FIG. 5, is represented by two hexadecimal digits or eight bits. Thus it takes thirty-two bits to identify an ensemble of four mapping points from the respective four mapping tables. 8D block encoder 126 identifies a particular such ensemble in response to its inputs and provides channel coder 132 with the thirty-two bits, namely d1–d32, which identify that particular ensemble.

In general, an ensemble comprising a particular combination of four individual mapping points is formed in accordance with a coding scheme. The coding scheme used in this embodiment is described hereinbelow.

The operations of 8D block encoder 126 and channel coder 132 are orchestrated by first and second algorithms residing in controller 145 which may be, for example, a microcomputer. These first and second algorithms are tailored for use in transmitting (1) only primary data and (2) secondary as well as primary data respectively. The activation of a particular one of these two algorithms is initiated by secondary channel synchronizer 150 via signaling to controller 145.

The first algorithm, activated when only primary data is transmitted, directs 8D block encoder 126 to take only bits c1–c29 as its input.

The second algorithm, activated when not only primary, but also secondary data is transmitted, directs 8D block encoder 126 to take as input not only bits c1–c29, but also one secondary data bit Si.

Figure 6:
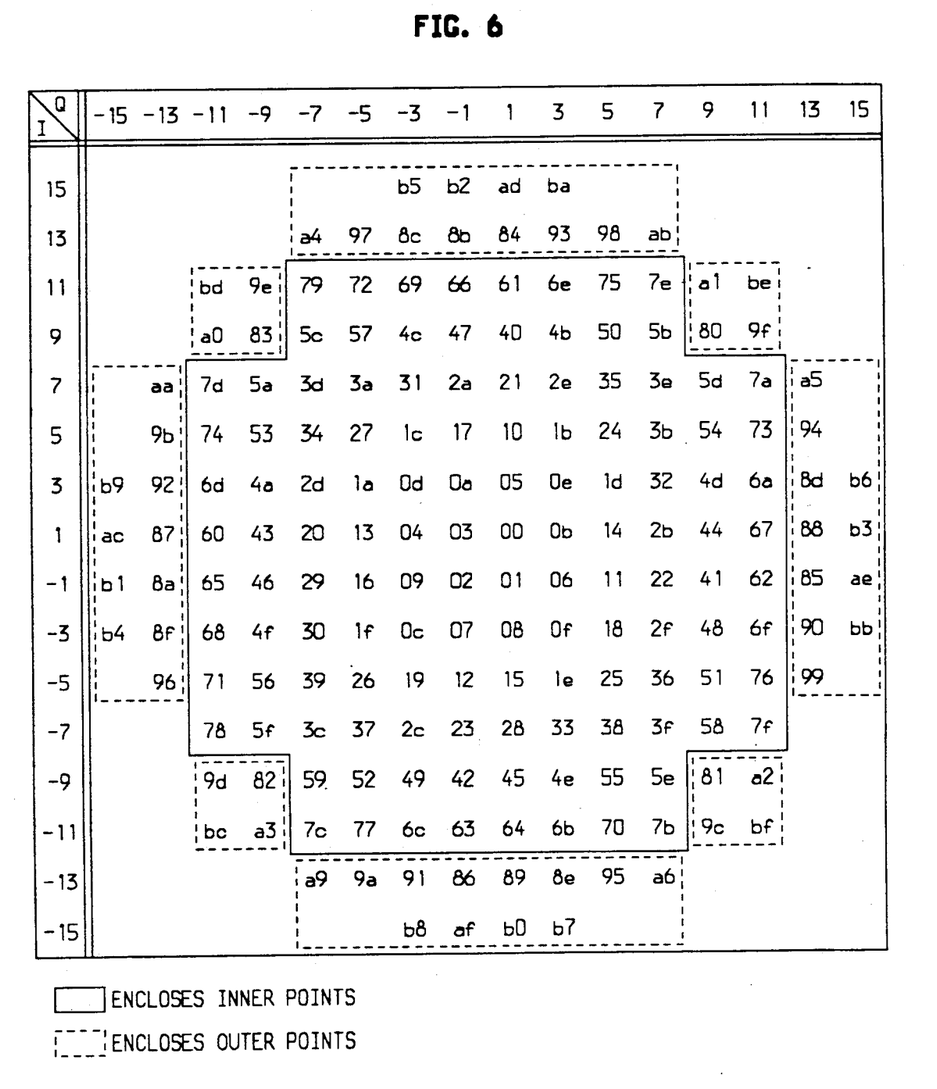
FIG. 6, an expanded version of FIG. 5, is one of four identical mapping tables associated with a second 8-dimensional signal constellation used to communicate secondary data as well as primary data between the transmitter of FIG. 1 and the receiver of FIG. 2 in accordance with the invention.

In particular, FIG. 6 shows one of four identical mapping tables illustratively used for transmitting secondary as well as primary data, i.e., when the second 8-dimensional signal constellation is used.

A closer look reveals that FIG. 6 is an expanded version of FIG. 5, i.e., every mapping point in FIG. 5 being included in FIG. 6. This being so, it can been shown that every channel symbol in the first 8-dimensional signal constellation associated with FIG. 5 is thus also included in the second 8-dimensional signal constellation associated with FIG. 6.

Figure 4:
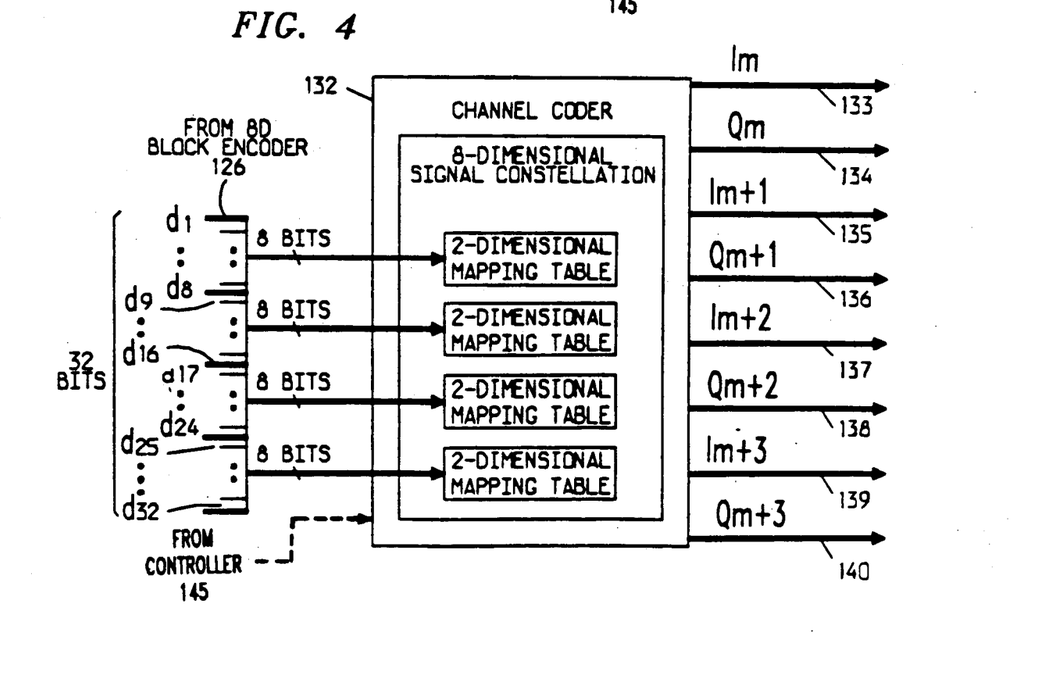
FIG. 4 is a block diagram showing the conceptual operation of a channel coder made part of the transmitter of FIG. 1.

As shown in FIG. 4, channel coder 132 maps, using the mapping tables, the four mapping points identified as hexadecimal digit pairs by 8D block encoder 126 into four corresponding pairs of in-phase and quadrature-phase amplitudes of the pulse components to be represented by four 2-dimensional DSB-QC pulses. The aforementioned first and second algorithms alternately apply FIG. 5 and FIG. 6 respectively as the mapping tables used by channel coder 132. Specifically, channel coder 132 generates on four pairs of cables, namely cables 133 and 134, cables 135 and 136, cables 137 and 138, and cables 139 and 140, four sets of digital representations of the in-phase and quadrature-phase amplitudes. These in-phase and quadrature-phase component pairs are designated Im and Qm, Im+1 and Qm+1, Im+2 and Qm+2, and Im+3 and Qm+3, respectively generated for the mth, m+1st, m+2nd and m+3rd baud intervals.

For example, channel coder 132 generates in-phase and quadrature-phase amplitudes of values (1, 1), (−1, 1), (−1, −1) and (1 −1) corresponding to mapping points 00. 01, 02 and 03 respectively in accordance with FIG. 5.

The output of channel coder 132 is applied to modulator 141, which generates four DSB-QC signals whose in-phase and quadrature-phase carriers have (Im, Qm), (Im+1, Qm+1), (Im+2, Qm+2) and (Im+3, Qm+3) as their amplitudes for respective m, m+1, m+2 and m+3 baud intervals so that the so-called carrier "state'-'—meaning those characteristics of the carrier signal which are information-bearing—is fixed for the duration of the transmission of each channel pulse in question. The DSB-QC signal thus generated, after conventional spectral shaping, is applied to a transmission, or communication, channel as signal x(t).

Figure 2:
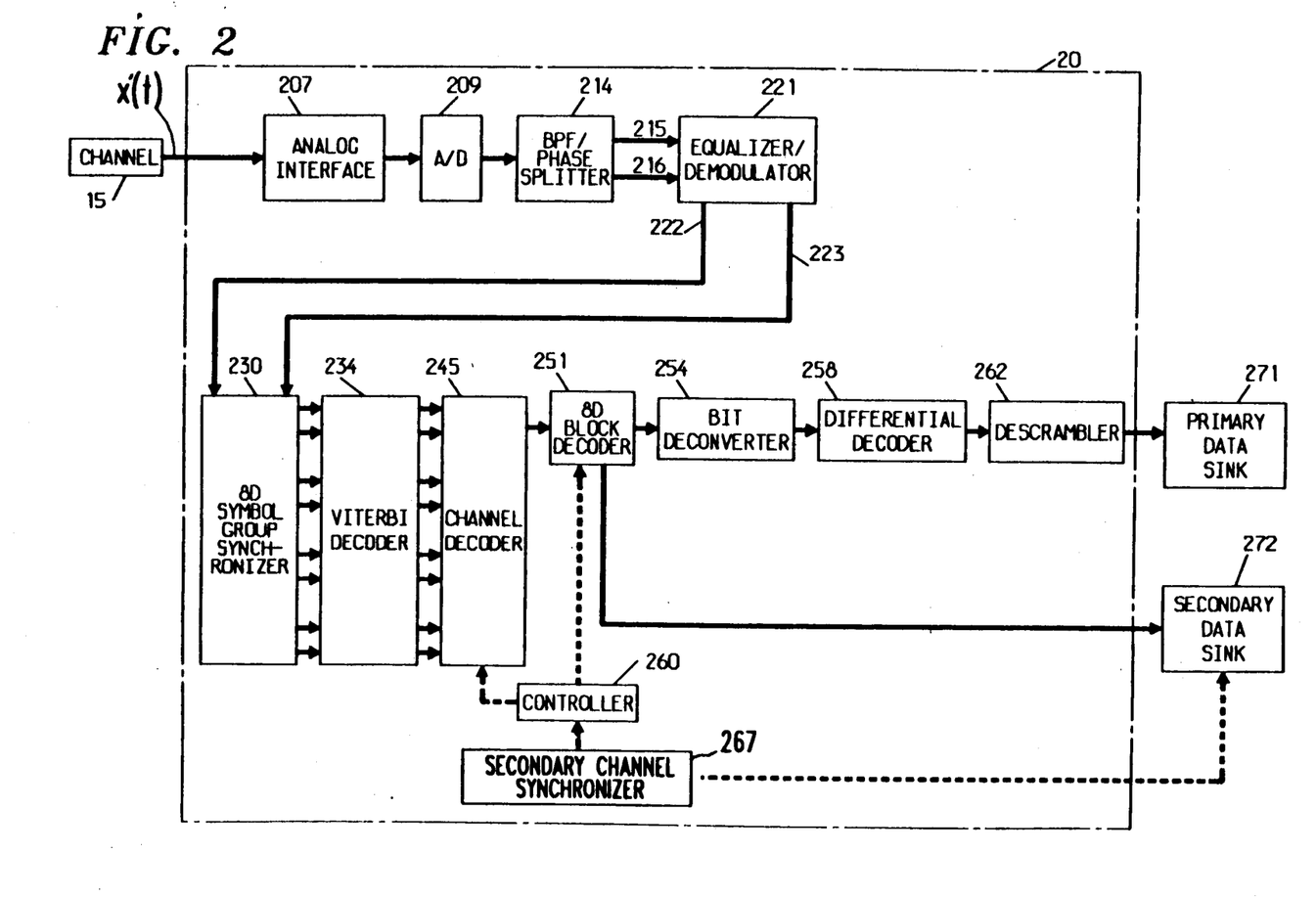
FIG. 2 is a block diagram of a data communication receiver embodying the principles of the invention.

Secondary channel synchronizer 150 maintains synchronization of secondary data source 102 and as mentioned before, initiates the activation of the first and second algorithms which separately orchestrate the operations of 8D block encoder 126 and channel coder 132. Secondary channel synchronizer 150 is a simple modulo n counter monitoring the number of 8-dimensional channel symbols transmitted, where n is defined in a manner to be described. In this illustrative embodiment, both secondary channel synchronizer 150 in transmitter 10 and secondary channel synchronizer 260 in receiver 20 are reset at the beginning of the training of equalizer/demodulator 221 in receiver 20. Other synchronization techniques, for example, the frame synchronization disclosed in U.S. Pat. No. 4,641,327, issued Feb. 3, 1987 to L. Wei, may be utilized.

The bit rate of secondary data, designated R2, can be engineered by using synchronizer 150 to activate the first and second algorithms in such a manner that every L 8-dimensional channel symbols representing only primary data are multiplexed with one 8-dimensional channel symbol representing one secondary data bit in addition to the primary data, according to the following formulae:

$$n = L + 1 \quad (1)$$

$$R2 = 1/n(R1) \quad (2)$$

where n is the modulus of the aforementioned counter serving as secondary channel synchronizer 150 and R1 is the 8-dimensional channel symbol rate.

In this embodiment, illustratively, L=1, R1=685.7142 baud (supra). Hence, n=2 and the secondary data bit rate (R2) is 342.8571 bps, as stated above.

Before we proceed further to delineate the processing of receiver 20, we herein describe the aforementioned coding scheme used in the present embodiment. This coding scheme is well known in the art.

Specifically, when only primary data is transmitted, as mentioned before, ensembles or combinations of four mapping points were identified by 8D block encoder 126 from the respective four mapping tables identical to FIG. 5. FIG. 5 is comprised of 128($2^7$) inner points (i's) enclosed in a solid cruciform box and 32($2^5$) outer points (o's) enclosed in rectangular dashed boxes. The coding scheme requires that the combination of four mapping points denoted s1, s2, s3 and s4 taken from the respective mapping tables denoted 1, 2, 3 and 4 consist of at least three inner points. This results in five classes of combinations. TABLE I below shows these five classes of combinations and the resulting number of the allowed individual combinations of mapping points formed thereby. Again, each particular combination of four mapping points identifies a particular set of four pairs of in-phase and quadrature-phase amplitudes of pulse components to be represented by four respective 2-dimensional DSB-QC pulses. These four pulses represent a particular 8-dimensional channel symbol. In other words, each particular combination of four mapping points uniquely represents a particular 8-dimensional channel symbol.

TABLE I

| A | B | | | | C |
|---|---|---|---|---|---|
| | | | | | # allowed individual mapping point combinations (or #8-dimensional channel |
| Class | s1 | s2 | s3 | s4 | symbol representations) |
| 1 | o | i | i | i | $2^5 \, 2^7 \, 2^7 \, 2^7 = 2^{26}$ |
| 2 | i | o | i | i | $2^7 \, 2^5 \, 2^7 \, 2^7 = 2^{26}$ |
| 3 | i | i | o | i | $2^7 \, 2^7 \, 2^5 \, 2^7 = 2^{26}$ |
| 4 | i | i | i | o | $2^7 \, 2^7 \, 2^7 \, 2^5 = 2^{26}$ |
| 5 | i | i | i | i | $2^7 \, 2^7 \, 2^7 \, 2^7 = 2^{28}$ |

Specifically, in class 1, mapping point s1 takes an assignment of an outer point of mapping table 1, and mapping points s2, s3 and s4 take assignments of inner points of mapping tables 2, 3 and 4 respectively (i.e., s1=o, s2=i, s3=i and s4=i). Since s1 can assume $2^5$ possible outer point values and s2, s3 and s4 can each individually assume $2^7$ possible inner point values, the number of possible individual combinations of s1, s2, s3 and s4 within the first class is $2^{26}$. Similarly, in class 2, the assignment of s1=i, s2=o, s3=i and s4=i yields a second $2^{26}$ possible individual mapping point combinations; in class 3, the assignment of s1=i, s2=i, s3=o and s4=i yields a third $2^{26}$ possible mapping point combinations; in class 4, the assignment of s1=i, s2=i, s3=i and s4=o yields a fourth $2^{26}$ possible combinations; finally in class 5, the assignment of s1=i, s2=i, s3=i, and s4=i yields the last $2^{28}$ possible combinations. Hence, the five classes of combinations yield a total of $2^{29}$ possible individual mapping point combinations.

The combining of mapping points in this particular manner, even though they were arbitrarily labeled as inner or outer points, accomplishes in identifying $2^{29}$ 8-dimensional channel symbol representations for twenty-nine bits, c1–c29, derived from primary data.

The coding scheme similarly restricts the combination of mapping points denoted s1', s2', s3' and s4' from four respective mapping tables denoted 1', 2', 3' and 4' when secondary as well as primary data is transmitted. As noted above, these four mapping tables are identical to FIG. 6 in this illustrative embodiment. FIG. 6 is comprised of 128($2^7$) inner points enclosed in a solid cruciform box and 64($2^6$) outer points enclosed in rectangular dashed boxes. The coding scheme requires the combination of s1', s2', s3' and s4' to include at least two inner points. This results in nine classes of combinations. TABLE II below shows these nine classes of combinations and the resulting number of allowed individual combinations of the mapping points formed thereby.

TABLE II

| A | B | | | | C |
|---|---|---|---|---|---|
| | | | | | # allowed individual mapping point combinations (or #8-dimensional channel |
| Class | s1' | s2' | s3' | s4' | symbol representations) |
| 1 | i | i | i | i | $2^7 \, 2^7 \, 2^7 \, 2^7 = 2^{28}$ |
| 2 | o | i | i | i | $2^6 \, 2^7 \, 2^7 \, 2^7 = 2^{27}$ |
| 3 | i | o | i | i | $2^7 \, 2^6 \, 2^7 \, 2^7 = 2^{27}$ |
| 4 | i | i | o | i | $2^7 \, 2^7 \, 2^6 \, 2^7 = 2^{27}$ |
| 5 | i | i | i | o | $2^7 \, 2^7 \, 2^7 \, 2^6 = 2^{27}$ |
| 6 | o | i | o | i | $2^6 \, 2^7 \, 2^6 \, 2^7 = 2^{26}$ |
| 7 | i | o | i | o | $2^7 \, 2^6 \, 2^7 \, 2^6 = 2^{26}$ |
| 8 | o | i | i | o | $2^6 \, 2^7 \, 2^7 \, 2^6 = 2^{26}$ |
| 9 | i | o | o | i | $2^7 \, 2^6 \, 2^6 \, 2^7 = 2^{26}$ |

These nine classes of combinations, as shown in TABLE II, yield a total of $2^{30}$ possible individual mapping point combinations or $2^{30}$ 8-dimensional channel symbol representations for thirty bits, c1–c29 plus Si, derived from primary and secondary data.

The aforementioned signal x(t) generated by transmitter 10 is corrupted in channel 15 by such impairments as Gaussian noise, phase jitter, frequency offset and intersymbol interference. As shown in FIG. 2, the received corrupted signal x'(t) is applied within the receiver to analog interface 207 which includes an antialiasing filter and automatic gain control (AGC) circuit. The resulting signal is then applied to A/D converter 209. The resulting digital samples are applied to bandpass filter/phase splitter 214. The latter provides two outputs on cables 215 and 216, these being a digital bandpass-filtered version of the A/D converter output and the Hilbert transform of same, respectively.

The signals on cables 215 and 216 are applied to equalizer/demodulator 221. For each baud interval, the latter provides as its output on cables 222 and 223 a pair of baseband equalizer outputs which respectively represent the values of the in-phase and quadrature-phase components of the received 2-dimensional carrier pulse currently being processed. Because, for example, the equalizer cannot perfectly compensate for all channel impairments, the values are not, in general, whole integers. Therefore, it remains to be determined from the outputs of equalizer/demodulator 221 what the most likely transmitted values were.

To this end, 8D symbol group synchronizer 230 collects four pairs of the equalizer/demodulator outputs to form individual 8-dimensional symbol groups. The output of 8D symbol group synchronizer 230 feeds Viterbi decoder 234 which, in conventional fashion, determines and outputs the most likely sequence of 8-dimensional symbol values from all of the allowed possibilities. Viterbi decoder 234 provides its output to the input of channel decoder 245.

Secondary channel synchronizer 267 in receiver 20 is structurally identical to secondary channel synchronizer 150 in transmitter 10, but functionally it maintains the synchronization of secondary data sink 272 and initiates the activation of another two algorithms residing in controller 260 which may be, for example, another microcomputer. These two algorithms separately orchestrate the operations of 8 D block decoder 251 and channel decoder 245 depending on whether (1) only primary data is received or (2) secondary data as well as primary data is received.

The operation of channel decoder 245 involves performing the inverse function to channel coder 132 of transmitter 10 by providing at its output the digital word corresponding to the set of four in-phase and quadrature-phase amplitudes of pulse components associated with the 8-dimensional symbol sequence just determined by Viterbi decoder 234.

Channel decoder 245 provides its output to the input of 8-D block decoder 251. The operation of the latter involves performing the inverse function to 8-D block encoder 126 of transmitter 10 and outputs a twenty-eight-bit digital primary data word to bit deconverter 254, and one secondary data bit directly to secondary data sink 272 only when the 8-dimensional channel symbol received also contains secondary channel information. The twenty-eight-bit primary data word is bit deconverted, differentially decoded and descrambled respectively by bit deconverter 254, differential decoder 258 and descrambler 262, the output of the latter is applied to primary data sink 271 which may be, for example, a computer terminal.

The preceding implementation of alternating two 8-dimensional signal constellations for transmitting respectively (1) only primary data and (2) secondary data as well as the primary data is in effect switching from a bit rate of 19.2 Kbps when transmitting only primary data to a higher bit rate of (19.2+0.686)=19.886 Kbps when transmitting both primary and secondary data. Therefore, an average bit rate of 19.543 Kbps is achieved.

Based on this observation, thus in general, various fallback speeds can be achieved by averaging a plurality of data bit rates. Using the arrangement disclosed above, this averaging scheme advantageously entails only a change in the coding of the data symbols, rather than the system hardware, in achieving these various fallback speeds.

For example, with the same hardware of the circuitry disclosed above transmitter 10 of FIG. 1 and receiver 20 of FIG. 2, an average user data rate of 16.8 Kbps can be achieved by alternating another two 8-dimensional signal constellations.

Figure 7:
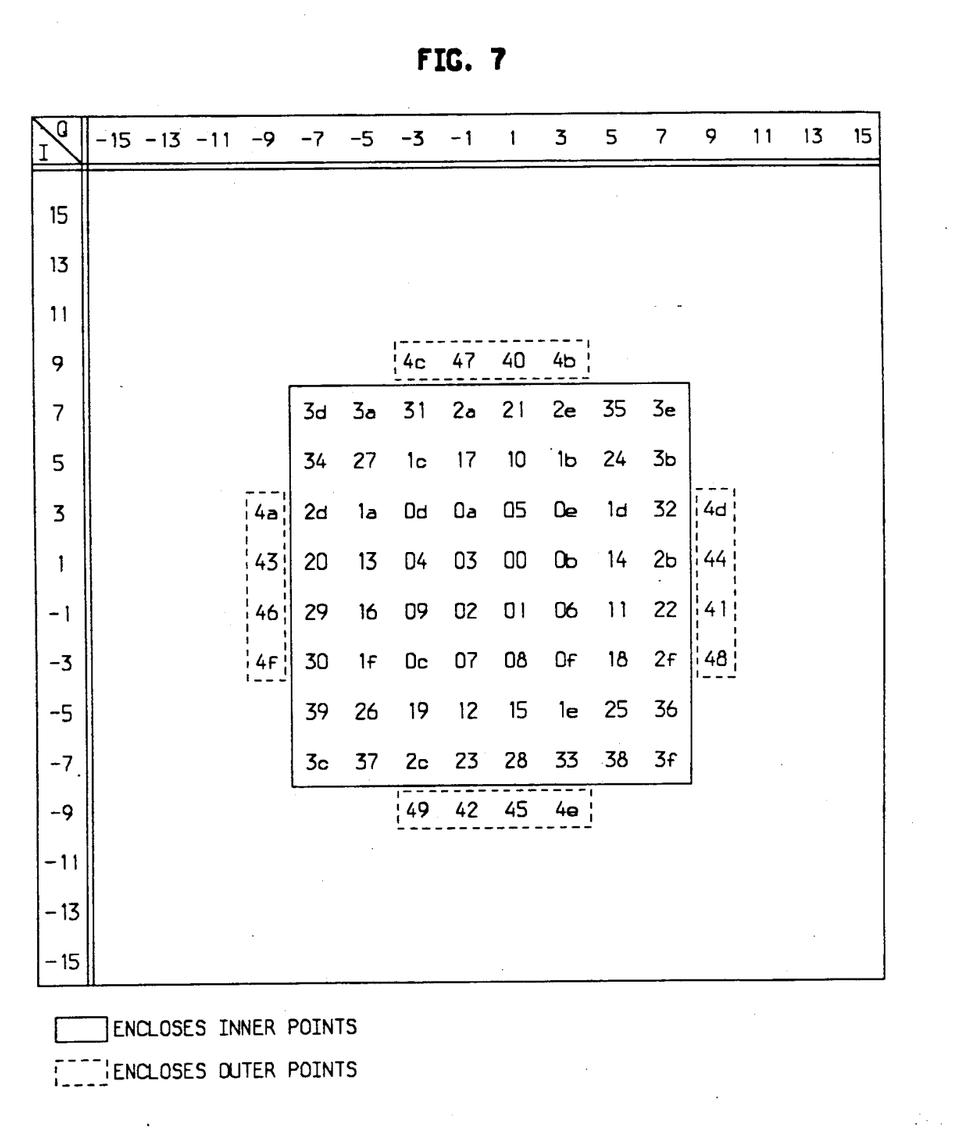
FIG. 7 is one of four identical mapping tables associated with a first, different 8-dimensional signal constellation used to communicate data at a first bit rate between the transmitter of FIG. 1 and the receiver of FIG. 2 in accordance with the invention.

Specifically, during one symbol interval, a first 8-dimensional channel symbol selected from a first, different 8-dimensional signal constellation is transmitted as four 2-dimensional DSB-QC pulses over channel 15. This first 8-dimensional channel symbol represents a group of twenty-four user data bits plus one trellis coding bit—twenty-five bits in total. The four pairs of in-phase and quadrature-phase amplitudes of pulse components to be represented by those four DSB-QC pulses are identified similarly as before from respective four mapping tables. These four mapping tables are identical and FIG. 7 is the mapping table used in this illustrative embodiment. FIG. 7 is comprised of 64 ($2^6$) inner points and 16 ($2^4$) outer points. Applying the aforementioned coding scheme and technique of combining inner points and outer points as outlined in TABLE I parts A and B, a total of $2^{25}$ individual mapping point combinations is realized. This corresponds to $2^{25}$ first 8-dimensional channel symbol representations for the above-mentioned twenty-five bits.

Figure 8:
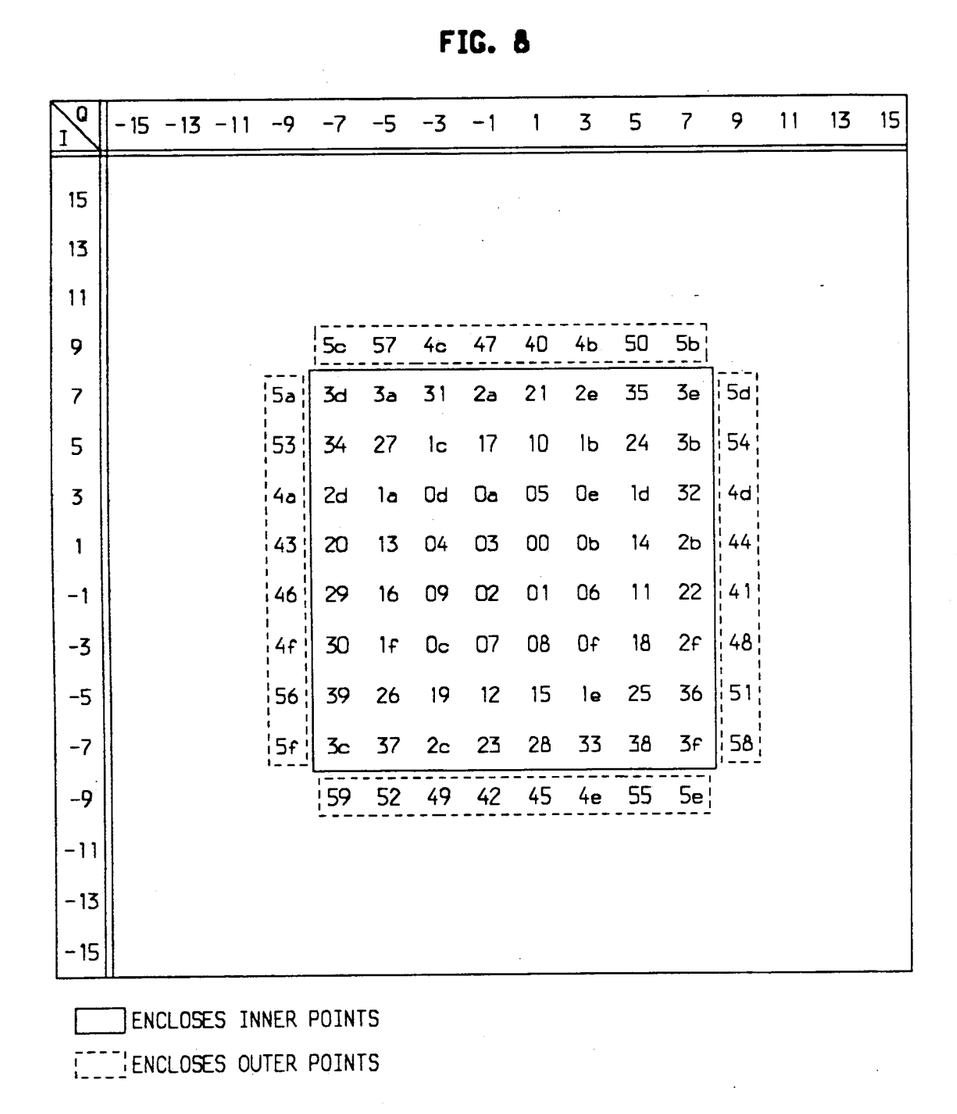
FIG. 8, an expanded version of FIG. 7, is one of four identical mapping tables associated with a second, different 8-dimensional signal constellation used to communicate data at a second higher bit rate than the first one between the transmitter of FIG. 1 and the receiver of FIG. 2 in accordance with the invention.

During another symbol interval, a second 8-dimensional channel symbol selected from a second, different 8-dimensional signal constellation is transmitted. This second 8-dimensional channel symbol represents a group of twenty-five user data bits and one trellis coding bit—twenty-six bits in total. The four mapping tables used in this case are, again, identical and FIG. 8 is the mapping table illustratively used. FIG. 8 is comprised of 64 ($2^6$) inner points and 32 ($2^5$) outer points. Applying the aforementioned coding scheme and technique of combining the inner points and outer points as outlined in TABLE II parts A and B, a total of $2^{26}$ individual mapping point combinations is realized. This corresponds to $2^{26}$ second 8-dimensional channel symbol representations for the above-mentioned twenty-six bits.

Based on the foregoing arrangement, by multiplexing the two user data inputs of sizes twenty-four and twenty-five bits and alternating their associated two signal constellations correspondingly, various fallback speeds are achieved in accordance with the following formula:

$$F = R1[24u + 25(1-u)] \quad (3)$$

where F is a fallback speed or an average user data rate in bits per second; R1 is the 8-dimensional symbol rate and u is the rate at which first 8-dimensional channel symbols are multiplexed with second 8-dimensional channel symbols.

In particular, R1=685.7142 baud (supra) and u=0.5 (i.e., first 8-dimensional channel symbols are transmitted half the time). The above-stated fallback speed of 16.8 Kbps is thus achieved.

The foregoing merely illustrates the principles of the invention, some variations of which include selection of different, and a different number of, symbols, including different in-phase and quadrature-phase component values, to carry the primary, secondary or fallback speed data, as well as the possibility of encoding secondary data words of more than one bit. Moreover, the invention is applicable to virtually any type of constellation geometry, including constellations which are other than rectilinear (e.g., circular), constellations whose data symbols have more than two dimensions. In addition, the invention can be used equally well in block, convolutional or other types of coding applications as well as with various types of modulation including, for example, QAM, phase shift keying, etc. Furthermore, the application can use different secondary channel synchronization schemes, such as blind synchronization, etc.

Each of the various possible approaches will have its own set of advantages and disadvantages, as will be apparent from the foregoing discussion, and the particular embodiment of the invention used for a particular application should, of course, be chosen based on the requirements and characteristics of that application.

It will thus be appreciated that those skilled in the art will be able to devise numerous arrangements which although not explicitly shown or described herein, embody the principles of the invention and are within its spirit and scope.

We claim:

1. Apparatus comprising
    means for receiving a stream of data bits,
    means responsive to one or more of said data bits for applying to a communication channel an individual one channel symbol of a selected one of a predetermined plurality of sets of channel symbols, and
    control means for selecting individual ones of said predetermined plurality of sets of channel symbols in repetitive alternation.

2. The invention of claim 1 wherein one set of said predetermined plurality of sets of channel symbols comprises every different channel symbol of another one or more of said sets.

3. The invention of claim 1 wherein the applying means includes means for encoding said one or more of said data bits in accordance with a trellis code.

4. Apparatus comprising
    means for receiving a stream of data bits,
    means operative for selecting individual sets of a predetermined plurality of sets of channel symbols, an individual one channel symbol of the selected individual one set of channel symbols being applied to a communication channel, said individual one channel symbol being associated with the value of one or more of said data bits, and
    control means for operating the selecting means to select said individual sets of said predetermined plurality of sets of channel symbols in repetitive alternation.

5. The invention of claim 4 wherein one set of said predetermined plurality of sets of channel symbols comprises every different channel symbol of another one or more of said sets.

6. Apparatus comprising
    means for receiving a stream of data bits,
    means for encoding one or more of said data bits in accordance with a trellis code,
    means operative for selecting individual sets of a predetermined plurality of sets of channel symbols, an individual one channel symbol of the selected individual one set of channel symbols being applied to a communication channel, said individual one channel symbol being associated with the value of the encoded version of said one or more of said data bits, and
    control means for operating the selecting means to select said individual sets of said predetermined plurality of sets of channel symbols in repetitive alternation.

7. The invention of claim 6 wherein one set of said predetermined plurality of sets of channel symbols comprises every different channel symbol of another one or more of said sets.

8. Apparatus comprising
    means operative for receiving data bits at a plurality of bit rates,
    means responsive to at least one of said data bits for applying to a communication channel an individual one channel symbol of an individual one set of a predetermined plurality of sets of channel symbols, said individual one set being associated with the bit rate at which said data bits are currently being received, and
    control means for operating the receiving means to receive said data bits at individual ones of said plurality of bit rates in repetitive alternation.

9. The invention of claim 8 wherein one set of said predetermined plurality of sets of channel symbols comprises every different channel symbol of another one or more of said sets.

10. The invention of claim 8 wherein the applying means includes means for encoding said at least one of said data bits in accordance with a trellis code.

11. Apparatus comprising
    means for receiving ensembles of bits in repetitive alternation, said ensembles having at least first and second sizes,
    means for defining an individual one set of a predetermined plurality of sets of channel symbols being associated with a particular one of said at least first and second sizes of the ensemble being currently received, and
    means for applying to a communication channel an individual one channel symbol of said individual one set of channel symbols, said individual one channel symbol being associated with the value of the received ensemble.

12. The invention of claim 11 wherein one set of said predetermined plurality of sets of channel symbols comprises every different channel symbol of another one or more of said sets.

13. Apparatus comprising
    means for receiving ensembles of bits in repetitive alternation, said ensembles having at least first and second sizes,
    means for defining an individual one set of a predetermined plurality of sets of channel symbols being associated with a particular one of said at least first and second sizes of the ensemble which is comprised of data bits and which is currently received,
    means for encoding said data bits in accordance with a trellis code, and
    means for applying to a communication channel an individual one channel symbol of said individual one set of channel symbols, said individual one channel symbol being associated with the value of the received ensemble.

14. The invention of claim 13 wherein one set of said predetermined plurality of sets of channel symbols comprises every different channel symbol of another one or more of said sets.

15. A method comprising the steps of
    receiving a stream of data bits,
    applying, in response to one or more of said data bits, to a communication channel an individual one channel symbol of a selected one of a predetermined plurality of sets of channel symbols, and
    selecting individual ones of said predetermined plurality of sets of channel symbols in repetitive alternation.

16. The invention of claim 15 wherein one set of said predetermined plurality of sets of channel symbols comprises every different channel symbol of another one or more of said sets.

17. The invention of claim 15 wherein said method further comprises the step of encoding said one or more of said data bits in accordance with a trellis code.

18. A method comprising the steps of
receiving a stream of data bits, and
selecting individual sets of a predetermined plurality of sets of channel symbols in repetitive alternation, an individual one channel symbol of the selected individual one set of channel symbols being applied to a communication channel, said individual one channel symbol being associated with the value of one or more of said data bits.

19. The invention of claim 18 wherein one set of said predetermined plurality of sets of channel symbols comprises every different channel symbol of another one or more of said sets.

20. A method comprising the steps of
receiving a stream of data bits,
encoding one or more of said data bits in accordance with a trellis code, and
selecting individual sets of a predetermined plurality of sets of channel symbols in repetitive alternation, an individual one channel symbol of the selected individual one set of channel symbols being applied to a communication channel, said individual one channel symbol being associated with the value of the encoded version of said one or more of said data bits.

21. The invention of claim 20 wherein one set of said predetermined plurality of sets of channel symbols comprises every different channel symbol of another one or more of said sets.

22. A method comprising the steps of
admitting data bits at a plurality of bit rates in repetitive alternation, and
applying, in response to at least one of said data bits, to a communication channel an individual one channel symbol of an individual one set of a predetermined plurality of sets of channel symbols, said individual one set being associated with the bit rate at which the data bits are currently being admitted.

23. The invention of claim 22 wherein one set of said predetermined plurality of sets of channel symbols comprises every different channel symbol of another one or more of said sets.

24. The invention of claim 22 wherein said method further comprises the step of encoding said at least one of said data bits in accordance with a trellis code.

25. A method comprising the steps of
receiving ensembles of bits in repetitive alternation, said ensembles having at least first and second sizes,
defining an individual one set of a predetermined plurality of sets of channel symbols being associated with a particular one of said at least first and second sizes of the ensemble being currently received, and
applying to a communication channel an individual one channel symbol of said individual one set of channel symbols, said individual one channel symbol being associated with the value of the received ensemble.

26. The invention of claim 25 wherein one set of said predetermined plurality of sets of channel symbols comprises every different channel symbol of another one or more of said sets.

27. A method comprising the steps of
receiving ensembles of bits in repetitive alternation, said ensembles having at least first and second sizes,
defining an individual one set of a predetermined plurality of sets of channel symbols being associated with a particular one of said at least first and second sizes of the ensemble which is comprised of data bits and which is currently recieved,
encoding said data bits in accordance with a trellis code, and
applying to a communication channel an individual one channel symbol of said individual one set of channel symbols, said individual one channel symbol being associated with the value of the received ensemble.

28. The invention of claim 27 wherein one set of said predetermined plurality of sets of channel symbols comprises every different channel symbol of another one or more of said sets.

* * * * *